(12) United States Patent
Ziraknejad et al.

(10) Patent No.: US 11,151,217 B2
(45) Date of Patent: Oct. 19, 2021

(54) DYNAMIC CONTEXTUAL LIBRARY

(71) Applicant: MicroStrategy Incorporated, Vienna, VA (US)

(72) Inventors: Siamak Ziraknejad, Reston, VA (US); Jiao Xu, Oakton, VA (US); Boyu Li, Herndon, VA (US); Quan Jia, Oakton, VA (US); Saurabh Abhyankar, McLean, VA (US); Timothy Lang, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/691,989

(22) Filed: Nov. 22, 2019

(65) Prior Publication Data

US 2020/0226195 A1  Jul. 16, 2020

Related U.S. Application Data

(60) Provisional application No. 62/792,740, filed on Jan. 15, 2019.

(51) Int. Cl.
| | | |
|---|---|---|
| *G06F 16/957* | (2019.01) | |
| *G06F 3/0482* | (2013.01) | |
| *G06F 16/955* | (2019.01) | |
| *G06F 16/93* | (2019.01) | |

(52) U.S. Cl.
CPC ........ *G06F 16/9577* (2019.01); *G06F 3/0482* (2013.01); *G06F 16/9566* (2019.01); *G06F 16/94* (2019.01)

(58) Field of Classification Search
CPC .......... G06F 16/24575; G06F 16/9577; G06F 3/0482; G06F 16/9566; G06F 16/94
See application file for complete search history.

(56) References Cited

U.S. PATENT DOCUMENTS

| | | |
|---|---|---|
| 7,089,237 B2 | 8/2006 | Turnbull et al. |
| 7,305,380 B1* | 12/2007 | Hoelzle .................. H04L 67/02 |
| 7,570,943 B2 | 8/2009 | Sorvari et al. |
| 8,001,105 B2 | 8/2011 | Bolivar et al. |
| 8,095,573 B2 | 1/2012 | Brave et al. |
| 8,447,760 B1 | 5/2013 | Tong et al. |
| 9,311,402 B2 | 4/2016 | Muskal et al. |
| 2006/0036966 A1* | 2/2006 | Yevdayev ............. G06F 16/951 |
| | | 715/779 |

(Continued)

*Primary Examiner* — Asher D Kells
(74) *Attorney, Agent, or Firm* — Fish & Richardson P.C.

(57) ABSTRACT

Methods, systems, and apparatus, including computer programs stored on a computer storage medium, for providing a dynamic contextual library. In some implementations, an interactive element is provided for display in a user interface. Context data that indicates a context of one or more computers is generated. Document data indicating a subset of documents from a document collection associated with a user is obtained, with the subset of documents being selected from the document collection based on the context data. After obtaining the data indicating the subset of documents, data indicating user interaction with the interactive element is received. Data identifying the subset of documents for display is provided in response to receiving the data indicating user interaction with the interactive element.

20 Claims, 4 Drawing Sheets

(56) References Cited

U.S. PATENT DOCUMENTS

| | | | |
|---|---|---|---|
| 2006/0129910 A1* | 6/2006 | Djabarov | G06F 40/14 715/207 |
| 2006/0277455 A1* | 12/2006 | Yamada | G06F 16/9535 715/206 |
| 2007/0157118 A1* | 7/2007 | Wuttke | G06F 16/957 715/810 |
| 2008/0235594 A1* | 9/2008 | Bhumkar | G06F 16/9038 715/738 |
| 2013/0125005 A1* | 5/2013 | French | G06F 16/951 715/738 |
| 2013/0145318 A1* | 6/2013 | Hosotsubo | G06F 3/0482 715/811 |
| 2013/0275429 A1 | 10/2013 | York et al. | |
| 2013/0326400 A1* | 12/2013 | Hosotsubo | G06F 3/0482 715/786 |
| 2018/0004843 A1 | 1/2018 | Koperski et al. | |
| 2019/0079946 A1* | 3/2019 | Li | H04L 67/2842 |

* cited by examiner

FIG. 3

DYNAMIC CONTEXTUAL LIBRARY

CROSS-REFERENCE TO RELATED APPLICATION

This application claims the benefit of U.S. Provisional Patent Application No. 62/792,740, filed on Jan. 15, 2019, the entirety of which is incorporated by reference herein.

BACKGROUND

Document collections can include large numbers of documents. Some systems allow a user to submit a search query or enter a search query to indicate which documents the user is looking for.

SUMMARY

In some implementations, a system can predictively filter a collection of documents based on the context of a user device and provide a user interface element to make the filtered set of documents easily accessible. The system can detect the context of the user device, and predict which documents are most applicable to the current context. The system can also provide a control, such as a button or menu item, that a user can interact with to view data identifying the currently selected set of documents. With this functionality, the system can provide a dynamically changing window to a document library, updating the document recommendations to keep them relevant to tasks performed on the user device without requiring the user to enter a search query or manually filter the contents of a document library.

The subset of documents recommended by the system can also change as the context of the user device changes. For example, as the user switches between different tasks or accesses information about different topics, the selected subset of documents can be refreshed. These operations can be performed in the background, before a user takes action to view the subset of documents. As a result, the documents can be indicated with very little delay, since the documents to be indicated are determine before the user requests to view them. In some implementations, some or all of the document content for documents in the subset can also be downloaded and predictively cached at the user device, allowing access to the documents without delays for network transfers.

Many organizations and individuals have document collections or libraries, which may be collections of private documents, publicly available documents, or a combination of both. A user may add a document to a collection in any of various ways, for example, by saving it to a folder, applying a bookmark or rating, annotating the document, and so on. Document collections often include dozens or hundreds of documents, which may cause a user to expend significant time and effort to browse a collection to find specific documents of interest. In addition, many interfaces for browsing and searching a document library require several steps to be able to find a document, e.g., opening an application, selecting a library or search function, entering search terms or filter criteria, and so on. These techniques for finding documents often require multiple user inputs and require the user to interrupt the current workflow by switching away from the application the user was previously working with.

The techniques discussed in this document can enable a user to quickly access documents relevant to content displayed on the user device, without needing to switch between applications or manually filter or search for documents. An interactive control can be integrated into the user interface of one or more applications, such as a web browser, an e-mail client, a document editor, etc. User interaction with the control can invoke display of the contextually-relevant subset of documents in a display area, such as drop-down panel, a pop-up window, an overlay pane, a frame of the application the control is integrated with, or another area. With this integration, the user can initiate display of the list of relevant documents without leaving the main interface. As another option, the control may be placed in a toolbar or other user interface element separate from an application, such as an operating system status area, an operating system taskbar, and so on. In some implementations, the user can initiate display of the list of documents predicted to be relevant with a single input or interaction, e.g., a single click or tap of a button.

Implementations can provide one or more of the following advantages. A system can predictively identify which documents are relevant to the context of a computing device and use the information to indicate the documents very quickly. Relevant documents can be identified before a user requests to view documents, so that when a user does perform a predetermined action, the information is already available and can be presented with minimum latency. The system can also make efficient use of limited display area. A small control taking up minimal area can be integrated into a user interface of an application, to allow documents from a document collection to be accessed in a variety of situations without having to switch to another application, even when the document collection is not related to the application. Display space is also efficiently used by limiting the documents identified to a selected subset determined to have high-relevance to the current context of the user device.

In one general aspect, a method performed by one or more computing devices comprises: providing, by one or more computing devices, an interactive element for display in a user interface of the one or more computing devices; generating, by the one or more computing devices, context data that indicates a context of the one or more computing devices; obtaining, by the one or more computing devices, document data indicating a subset of documents from a document collection associated with a user of the one or more computing devices, the subset of documents being selected from the document collection based on the context data that indicates the context of the client device; after obtaining the data indicating the subset of documents, receiving, by the one or more computing devices, data indicating user interaction with the interactive element; and in response to receiving the data indicating user interaction with the interactive element, providing, by the one or more computing devices, data identifying the subset of documents for display.

In some implementations, the user interface is a user interface of an application running on the one or more computing devices, and the interactive element is provided by a third-party extension module for the application.

In some implementations, the application is a web browser, and wherein the context data comprises a uniform resource locator (URL) for a resource displayed in the web browser.

In some implementations, the method includes detecting, by the extension module, that the web browser changed from presenting a first document with a first URL to presenting a second document with a second URL. Generating the context data and obtaining the data indicating a subset of documents are performed in response to detecting that the web browser changed from presenting the first document with the first URL to presenting the second document with the second URL.

In some implementations, providing the data identifying the subset of documents for display comprises displaying an information panel overlay on the user interface, the information panel overlay identifying the documents subset of documents and including one or more interactive elements configured to open the one or more documents subset of documents in response to user interaction.

In some implementations, the method includes, after providing the interactive control for display, repeating a series of operations that includes: detecting a change in the context of the one or more computing devices; generating updated context data indicating the changed context of the one or more computing devices; and obtaining, based on the updated context data, updated document data indicating an updated subset of documents selected from the document collection.

In some implementations, the method includes determining an identifier for the user, wherein the document collection is a personalized document collection that corresponds to the user and has a predetermined set of documents.

In some implementations, obtaining the document data indicating the subset of documents from the document collection associated with the user comprises: providing the context data to a server system over a communication network; and receiving the document data from the server system over the communication network in response to providing the context data.

In some implementations, the method includes: in response to providing the context data, receiving document content for at least a particular document in the subset of documents; caching the document content at the one or more computing devices; after providing the data identifying the subset of documents for display, receiving data indicating interaction with an interface element for the particular document; and in response to receiving the data indicating interaction with the interface element for the particular document, using the cached document content to display a representation of the particular document.

In some implementations, obtaining the document data indicating the subset of documents from the document collection associated with the user comprises selecting, by the one or more computing devices, a subset of the documents using an index of the documents in the document collection stored by the one or more computing devices.

In some implementations, the user interface is a user interface of a web browser, and the web browser displays a resource corresponding to a uniform resource locator (URL). Obtaining the document data indicating the subset of documents from the document collection associated with the user comprises obtaining data indicating a set of documents that are not hosted in the same Internet domain as the URL but have a predetermined association with at least a portion of the URL.

In some implementations, obtaining the document data indicating the subset of documents from the document collection associated with the user comprises obtaining data indicating documents selected based on at least one of: output of one or more machine learning models generated in response to receiving the context data as input; previous document accesses by the user or other users; determining that one or more terms in the user interface are included in one or more documents in the document collection; or determining that the user interface is associated with a particular topic and that one or more documents in the document collection are associated with the particular topic.

In some implementations, the context data indicates at least one of: an identifier for a document presented in the user interface; an identifier for an application running on the one or more computing devices; text from the user interface; a geographic location of the one or more computing devices; or data identifying one or more devices or user within a threshold level of proximity of the one or more computing devices.

In some implementations, generating the context data comprises generating data indicating that document content of a document displayed in the user interface comprises one or more keywords from a predetermined set of keywords. Obtaining the document data indicating the subset of documents from the document collection associated with the user comprises obtaining, based on the context data, data indicating a subset of documents, from the document collection, that include or are associated with the one or more keywords included in the user interface.

In some implementations, providing the interactive element for display comprises displaying an interactive element that is configured to cause the user interface to display, in response to a single interaction, a user interface panel identifying one or more documents determined to be relevant to the current context of the one or more computing devices. The subset of documents from the document collection is selected based on the context data and is based on neither a search query nor filter criteria entered by the user to the user interface. The user interaction with the interactive element comprises a single click, tap, or swipe on the interactive element. Providing the data identifying the subset of documents for display comprises causing a user interface panel to appear that includes an interactive element configured to cause a particular document in the subset of documents to be displayed in response to user interaction with the interactive element in the user interface panel.

In some implementations, the method includes setting an appearance of the user interface element to indicate that one or more documents are available in response to obtaining the document data indicating the subset of documents. For example, the one or more computers can change an appearance of the user interface element to indicate that one or more documents are available in response to identifying documents relevant to the current context. Similarly, the one or more computers can change an appearance of the user interface element to indicate that documents are not available in response to determining that documents relevant to the current context are not available. The user interface element can be formatted with a color, style, shape, icon, number, text, or other formatting to indicate the status of available documents. In some implementations, the user interface element can include an overlay or region indicating a number of document(s) identified as relevant, a type or category of the document(s) identified as relevant, etc. In some implementations, the user interface element is simply changed between a first appearance that indicates that at least one document is available and a second appearance that indicates that no document is available. The appearance of the user interface element can be updated in response to events that change the number of relevant documents identified, including in response to changes in the current context, changes in the content of documents or set of documents that can be provided (e.g., changes in a document corpus from which documents are identified), changes in mappings or other associations between documents and context data (e.g., URLs, topics, etc.), changes in the state of machine learning models or user behavior patterns, and so on.

Other embodiments of these and other aspects disclosed herein include corresponding systems, apparatus, and computer programs encoded on computer storage devices, where the systems, apparatus and computer programs are configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 2 and 3 are diagrams illustrating examples of user interfaces showing information for a dynamic contextual library.

Like reference numbers and designations in the various drawings indicate like elements.

DETAILED DESCRIPTION

Figure 1:
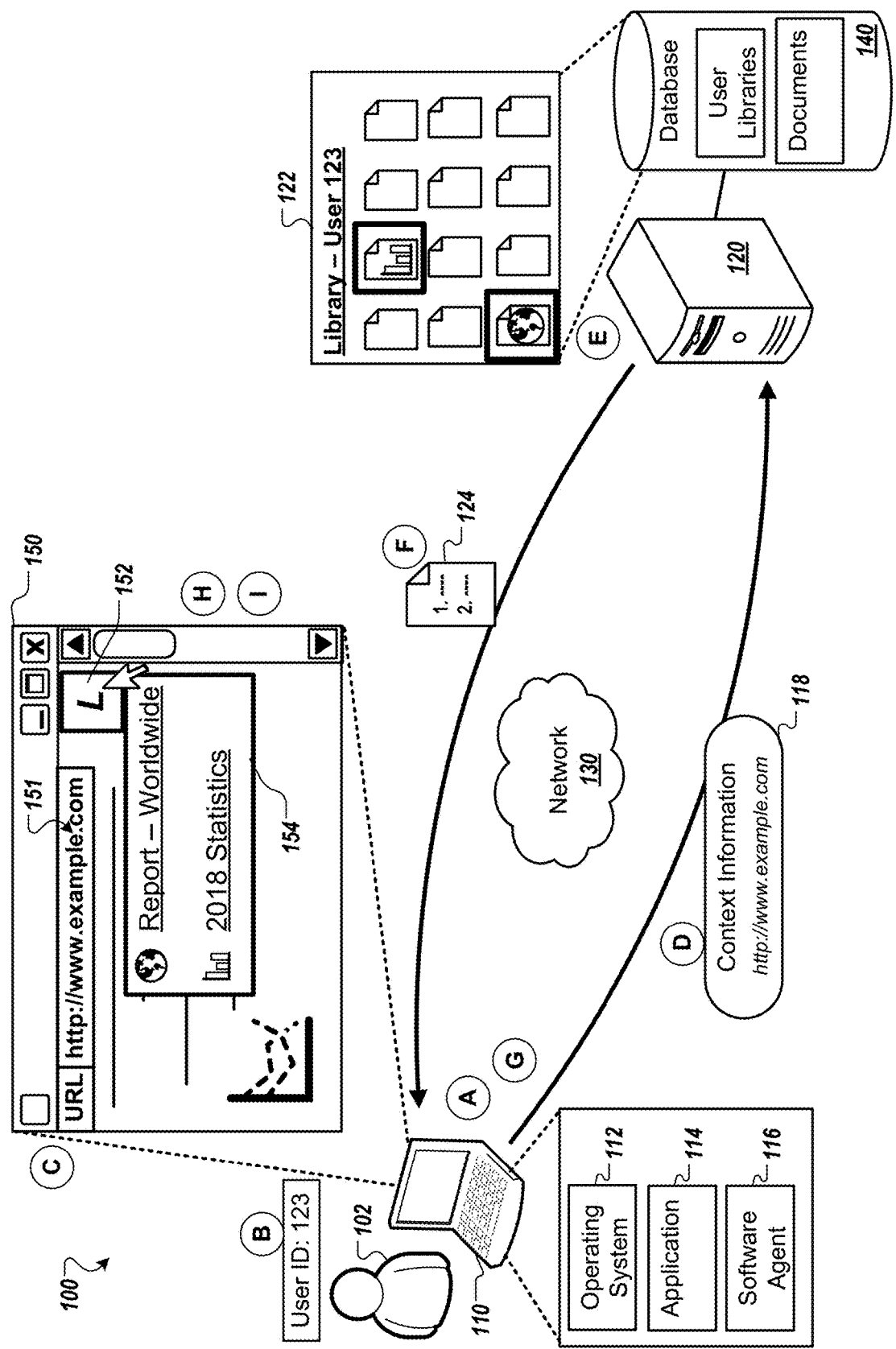
FIG. 1 is a diagram of an example of a system for providing a dynamic contextual library.

FIG. 1 is a diagram of an example of a system 100 for inline delivery of database content. The system 100 includes a client device 110, a server 120, and a network 130. The server 120 has access to a database 140, which may be a private database for an organization such as a company. The server 120 may be implemented using multiple computers that cooperate to perform the functions discussed below, and which may be located remotely from each other. The client device 110 stores and executes an operating system 112, an application 114, and a software agent 116. As discussed below, the software agent 116 can dynamically identify and indicate documents that are relevant to the current context of the client device 110, without requiring the user 102 to enter a search query. FIG. 1 shows a series of stages (A)-(I) that represent a flow of data and operations of the system 100.

Briefly, the example of FIG. 1 shows the client device 110 providing a user interface 150 that can indicate contextually relevant documents from within an application. The client device 110 detects a current context of the device and identifies a user 102 associated with the client device 110. The client device 110 then sends context information indicating the current context to the server 120, which uses the context information to select a subset of documents from a collection. For example, the documents can be selected from a personal library or personal collection associated with the user 102. The server 120 sends data identifying the selected subset of documents to the client device 110. When the user 102 interacts with a control 152 in user interface 150, the client device 110 displays an information panel 154, such as a drop-down overlay panel, indicating the selected subset of documents previously selected and indicated by the server 120. The information panel 154 can include links or other interactive elements that can be used to open the documents identified in the panel 154.

The client device 110 is associated with a user 102, who may be a member of an organization, e.g., an employee of a company. The user 102 may have a library or collection of documents associated with the user 102, for example, a private collection of documents associated with a user account for the user 102. In some implementations, the library may be a collection associated with multiple users, such as multiple employees in a particular department or all employees of a company. The library may have access restricted so that only the user 102 or only users granted access authorization by the organization of the user can access the documents. In other implementations, however, the library may represent a more general set of documents, such as a set of publically available documents or Internet documents generally.

The client device 110 runs an application 114, which is a web browser in the example of FIG. 1. The client device 110 also runs a software agent 116, which performs a number of tasks in the background to obtain and prepare information about contextually-relevant documents for display. The software agent 116 can provide a control 152 that is integrated with the user interface 150 for the application 114. In the illustrated example, the software agent 116 is an extension module, such as a toolbar element, that provides a persistent interactive control 152 among the navigation controls of the web browser, so that the control 152 is visible and accessible as the user navigates between documents and scrolls up and down the documents. In other implementations, the application 114 can be a document editor, an e-mail client, a calendar application, or any other type of application. Similarly, the software agent 116 may provide the control 152 as a stand-alone interface element, such as a or window or toolbar, and/or may provide the control 152 as an element in a toolbar, status indicator area, notification area, or other area provided by the operating system 112.

The example of FIG. 1 will now be explained in further detail. In stage (A), the client device 110 runs the software agent 116 provides the control 152. In the example, the control 152 is integrated with the user interface 150 for the application 114, so that a user can access the control 152 without switching to a different application. This can be done even when application 114 is provided by a third party that does not manage or have access to the document collection that the control 152 provides access to. For example, the extension an extension module or other add-on component integrated with the application 114, which may be a web browser, e-mail application, or other application. The software agent 116 can provide the control 152 as a toolbar, an icon, a button, or in another form. As discussed below, the control 152 can be configured to invoke the presentation of a list of a selected subset of documents, where the selected subset of documents changes dynamically in response to changes in the context of the client device 110 and in particular the application 114.

In stage (B), the software agent 116 identifies the user 102. For example, when the software agent is installed, and optionally each time the application 114 and/or software agent 116 is used, the user 102 may be prompted to authenticate by logging in with a user name and proof of identity, such as a password, a personal identification number, biometric scan, etc. Through authentication data or simply through a stored identifier, the software agent 116 stores or otherwise has access to data indicating an identifier for the user 102. In some cases, the user identity may be tied to the authentication for the device, e.g., the unlock code for a phone, the user account for a computer, etc. which can be linked to a specific user identity or user identifier recognized by the server.

The software agent 116 can use the identifier for the user 112 in communications with the server 120, which can help coordinate retrieval of information about the documents in a personalized document collection for the user 102. Additionally or alternatively, the user identifier or other authentication information can be used to obtain information about documents in a document collection for an organization in which the user 102 is involved, or a document collection that is secured but which the user 102 has been granted authorization to access the document collection.

In stage (C), the software agent 116 detects a current context of the client device 110. In particular, the software agent 116 can determine a context of the application 114 and detect when the context of the application 114 changes. The software agent 116 generates context data 118 indicating the identified context of the client device 110. This context data 118 can then be used later to select documents that are relevant to the current tasks the user 102 is performing using the client device 110.

The context can represent various aspects of the state of the client device 110 and how the client device 110 is being used. Examples include an identifier for a document that is open, an identifier for an application that is running or is in the foreground, an indication of a geographic location of the client device 110, an indication of other devices or users within a threshold distance of the client device 110, and so on. Determining the context can include obtaining and analyzing content of the user interface 150, such as obtaining text content of the user interface 150 and/or a document displayed in the user interface 150. The client device 110 may store a set of keywords, or obtain a set of keywords from the server 120, and may determine which keywords in the set, if any, are included in the text content of the user interface 150. Determining the context can also include determining which applications are currently in use (e.g., running, visible on a display, in the foreground or in focus, etc.). The context may also include identifiers for a task or document accessed by the system. To determine the current context and/or detect changes in context, the software agent 116 may detect events or inputs, such as user interaction with certain buttons or controls.

In the illustrated example, a web browser application is running on the client device 110. The user navigates to a web page or web application having a URL 151. The software agent 116 detects a navigation event indicating that the browser is navigating to a new resource, and determines the URL 151 for the resource to be presented. The software agent 116 may acquire other information, such as text content of the document in the web browser, keywords (e.g., terms or phrases from of a predetermined set) identified in the document, a location of the client device 110 determine with a global positioning system (GPS) or through detection of location beacons, etc.

In stage (D), the software agent 116 causes the client device 110 to send the context data 118 to the server system 120. As illustrated, the client device 110 can send the context data 118 over a communication network 130, such as the Internet. The context data 118 can be sent with or as part of a request for document data indicating documents predicted to be relevant to the current context. The request may include a user identifier for the user 102, to identify the user whose personal document collection the results should be identified from. In addition, or as an alternative, information identifying the user 102 can be used to identify which documents the user 102 has access to obtain.

In stage (E), the server system 120 selects one or more documents based on the context data 118. For example, the server system 120 can use the context data 118 to filter a collection of documents associated with the user down to a subset representing a few documents determined to be most relevant to the current context of the client device 110. This can be done without any search query entered by the user 102 and without any filter criteria entered by the user 102. In the illustrated example, two documents are identified as relevant to the context from among the documents in a document collection 122.

In the example, the user 102 has a personal document collection or library 122 that is managed by the server system 120 or another system. The server system 120 can access a database 140 that stores data indicating the contents of document collections for the user 102 and other users, as well as potentially the actual content of the documents. Documents from any of various types of document collections can be identified. For example, a document collection for the user 102 may represent documents that have been acted on by the user 102 in some way, e.g., documents that the user 102 has accessed, edited, created, shared, saved, bookmarked, and/or manually added to a collection. In some implementations, some or all of the documents in the document collection are documents provided through a secure interface that requires authentication for access. Some or all of the documents in the document collection may be stored by and/or served by the server 120, which may represent an enterprise application server or file server for an organization that the user 102 is a member of.

The server system 120 may use any of various techniques to select which documents in the collection 122 are relevant to the current context of the client device 110, if any. In some implementations, the server system 120 can store a mapping between documents and keywords or topic identifiers. For example, a term such as "computer screen" may be mapped directly to certain documents hosted by the server system 120. If the term "computer screen" appears in the user interface 150 and the corresponding documents are included in the user's document collection 122, those documents may be selected as relevant to the current context.

In some implementations, the mapping can identify specific documents to be shown as relevant for a certain uniform resource locator (URL) or Internet domain. For example, an administrator for an organization may manually specify URLs or Internet domain names associated with specific documents. The documents specified in this manner are generally not available at the URLs or domains associated with them. For example, the URL "http://www.example.com/mail" for an e-mail web page may be associated with a contact information document listing email addresses for employees in the company where the user 102 works, even though the contact information document is not publicly available on the Internet and is not hosted in or related to the "example.com" domain. The contact information document can help facilitate the task of drafting an email, which the user 102 may likely perform if on the "http://www.example.com/mail" web page. Documents like the contact information document may be manually or automatically mapped to URLs and domains when their content complements or facilitates tasks that are commonly done when browsing the URLs and domains. The mapping relationship may be one-to-one, but is not required to be. For example, many different URLs or domain names may be mapped to the same document or set of documents, and one URL or domain name may have many different documents mapped to it.

As another example, the server system 120 can use information about prior document accesses by the user 102 or other users to select the documents from the document collection 122. For example, with log data indicating previous document accesses and the contexts for those document accesses, the server system 120 can determine whether any documents were accessed in a context that is the same or similar to the one indicated by the context data 118 for the user 102. If there is a sufficient pattern of accesses, e.g., at least a threshold amount of accesses to a document in a certain context or a pattern that shows at least a minimum level of consistency over time, the server system 102 may select the document as relevant to the current context.

As another example, the server system 120 may use one or more machine learning models to predict which documents in the document collection 122 are relevant to the current context. A machine learning model may include, for example, a maximum entropy classifier, an artificial neural network, a decision tree, a support vector machine, a regression model, a clustering model, or other type of model. Machine learning models can be trained using log data indicating content of user interface and other data at the time users initiated access to other documents. From this data, the models can be trained to associate terms in user interfaces (any potentially geographic locations and other contextual elements) with document types, topics, and even specific documents. As a result of the training, the machine learning models can output, for example, scores indicating a level of confidence about whether each of multiple topics, keywords, and/or document identifiers are relevant to the current context.

The server system 120 may generate information retrieval scores for the documents in the collection 122 and may compare the scores to a minimum threshold. The scores may be generated based on multiple factors, e.g., with the scores being generated based on a weighted aggregation of component scores determined using keyword matching, machine learning outputs, prior access history by the user 102, etc. Documents assigned scores that indicate at least the minimum level of relevance may be selected as likely relevant to the current context of the client device 110. In some implementations, the documents in the collection 122 are ranked based on the scores, and only a highest-ranking subset are provided, e.g., no more than the top 10 or top 5 most relevant documents are selected.

In stage (F), the server system 120 sends document data 124 that identifies the selected documents to the client device 110. The document data 124 can include various information that identifies the selected documents, such as a title, keywords, a summary or text snippet, an icon, an image, and so on. The document data 124 can also include information to facilitate access to the documents, such as document identifiers, URLs, or other references to where the documents can be retrieved.

In some implementations, the server system 120 also provides some or all of the content of the selected documents. This can be provided to the client device 110 to allow the client device 110 to preload the document content into a local cache stored on the client device 110. That way, if the user decides to view one of the selected documents, the content of the document can be presented with minimal latency, because the document content is already present and there is no need to wait for it to be transferred over the network. The transfer of document content for caching at the client device 110 may be initiated by the server system 120 (e.g., pushed to the client device 110) or may be initiated by the client device 110 (e.g., document content may be requested by the client device 110 upon receiving the document data 124 identifying the documents).

In stage (G), the software agent 116 waits for user interaction with the user interface element 152. In the meantime, the software agent 116 monitors for changes in the context of the application 114 and the client device 110. In response to changes in the context, the software agent can cause stages (C)-(F) to be repeated so that an up-to-date set of selected documents for the current context is available.

In some implementations, the software agent 116 may change the appearance of the user interface element 152 based on the number and/or type of documents determined to be available for the current context. For example, if no documents are available for the current context, an unannotated icon may be shown, or the element 152 may be grayed out and made inaccessible to show that no content is available. By contrast, when items from the collection 122 have been predicted to be relevant to the current context, the element 152 can be made active, and may be annotated with different formatting, with an indicator, with animation, or with another technique to show the availability of content. For example, the software agent 116 can cause one of the corners of the element 152 to include a number indicating how many documents are considered relevant to the current context.

In some implementations, the software agent 116 can change an appearance of the user interface element to indicate that one or more documents are available in response to identifying documents relevant to the current context. Similarly, software agent 116 can change an appearance of the user interface elements to indicate that documents are not available in response to determining that documents relevant to the current context are not available. The user interface element can be formatted with a color, style, shape, icon, number, text, or other formatting to indicate one or more characteristics of the set of available documents predicted to be relevant to the current context. In some implementations, the user interface element can include an overlay or region indicating a number of document(s) identified as relevant, a type or category of the document(s) identified as relevant, etc. In some implementations, the user interface element is simply changed between a first appearance that indicates that at least one document is available and a second appearance that indicates that no document is available. The appearance of the user interface element can be updated in response to events that change the number of relevant documents identified, including in response to changes in the current context, changes in the content of documents or set of documents that can be provided (e.g., changes in a document corpus from which documents are identified), changes in mappings or other associations between documents and context data (e.g., URLs, topics, etc.), changes in the state of machine learning models or user behavior patterns, and so on.

In stage (H), the software agent 116 detects interaction with the user interface element 152. The user interface element 152 can be designed to respond to any appropriate type of interaction, such as a click, a mouseover gesture (e.g., a hover of a cursor over the element 152 for at least a minimum amount of time), a tap gesture, a swipe gesture, a drag gesture, etc.

In stage (I), the software agent 116 causes an information display panel 154 to be provided in the user interface 150 in response to the user interaction with the control 152 (e.g., in response to detecting the user interaction or receiving data indicating that the user interaction occurred). The panel 154 can be provided as an overlay or pop-up display so that the user 102 is presented a list of the documents predicted to be relevant without leaving the user interface 150 for the application 114. Because the document data 124 indicating the documents relevant to the current context was received before the user 102 interacted with the control 152 to request to view relevant documents, the panel 154 and the information within can be provided very quickly after the user interaction.

The panel 154 can include an interactive control, such as a hyperlink, for each document indicated, to allow the user 102 to select and initiate opening of the document. The document may be opened in the application 114 or in another application when the interactive control is interacted with (e.g., selected, manipulated, or otherwise activated) by a user. When the application 114 is a web browser, the selected document may be opened in a new window or tab. When the software agent 116 has previously pre-loaded the document content of a document in a local cache, selecting the interactive control for opening a document can cause the cached version of the document to be opened, to provide a fast response time.

In some implementations, rather than providing a panel 154, one or more documents can be opened directly, rather than requiring a user to view the panel 154 and select an interactive control to view the document. For example, the document having a relevance score that is highest among the documents predicted to be relevant to the context can be opened automatically and provided for viewing by the user.

Various alternatives or variations of the example in FIG. 1 can be made. For example, instead of relying on the server 120 to select the documents that are relevant for the current context, the client device 110 may itself select documents that are predicted to be relevant. For example, the client device 110 may locally store information about documents in the collection 122. For example, the client device 122 may store an index of documents in the collection 122 that can be periodically synchronized with the server 120. The client device 110 may then generate scores for the documents and select documents using the same techniques as the sever system 120, e.g., keyword matching, topic or category matching, using pre-assigned mappings between documents and URLs or domain names, using output of machine learning models, and so on.

Figure 2:
Figure 3:
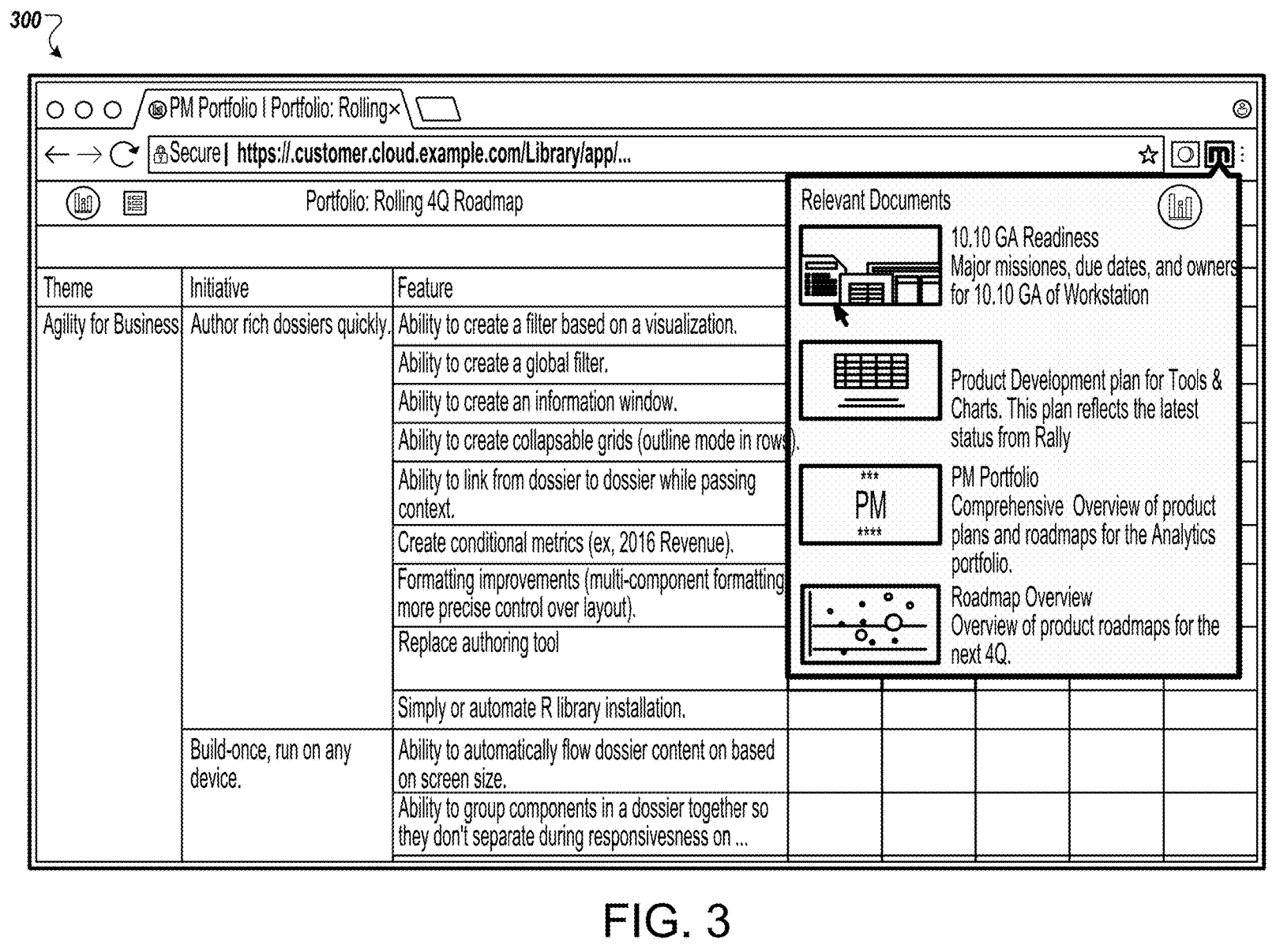

FIGS. 2 and 3 are diagrams illustrating examples of user interfaces 200, 300 showing information for a dynamic contextual library. In FIG. 2, the user interface 200 relates to testing of a software product. As a result, based on the content of the document shown in the web browser and/or the content of the URL, the set of documents determined to be relevant to the context relate to testing, e.g., documents about defect analysis and quality assurance (QA). In FIG. 3, the same user and library are involved, but the web browser navigated to a different web page which relates to a different topic, e.g., a product planning roadmap. Because the content of the document in the interface and the URL for the document have changed, the extension module indicates that a different set of documents are relevant to the context. In this manner, as the user browses and changes from one task to another, the extension module can automatically update and refresh the set of documents indicate to be relevant.

Figure 4:
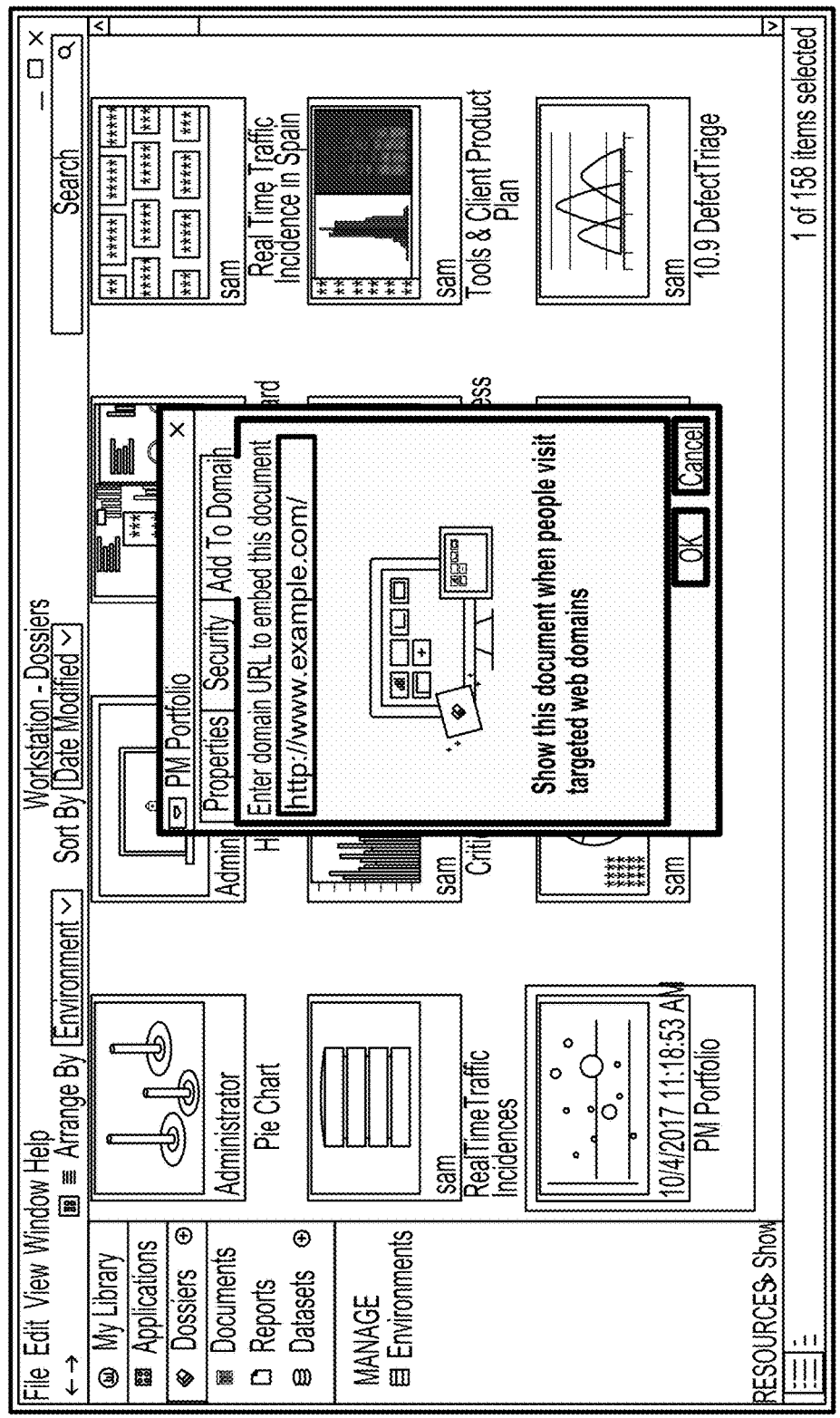
FIG. 4 is a diagram illustrating an example of a user interface for associating documents with a context.

FIG. 4 is a diagram illustrating an example of a user interface 400 for associating documents with a context. To allow users to customize how the contextual library operates, a computer system can provide features to allow users to define specifically which documents should be indicated as relevant to other documents. More generally, a computer system can provide features to indicate, for a particular document or a particular group of documents, the topics and characteristics that should trigger the inclusion of the particular document or particular group of documents as relevant.

A computer system can provide a user interface that identifies documents, e.g., with icons and/or names of the documents in a list, grid, or other arrangement. Documents can be identified individually or in groups. The user interface 400 includes functionality that allows a user, such as an administrator, to assign the certain documents in a collection to be indicated as relevant for specific URLs and/or Internet domains. For example, clicking a particular document in a collection (e.g., "PM Portfolio") can bring up the prompt shown. The prompt may be an option in a context menu, e.g., one surfaced by "right-clicking" on a representation of the particular document. This prompt includes a field allowing a user to enter one or more URLs (e.g., "http://www.example.com/") to be associated with the particular document. The computer system saves the entered URL to associate the URL as a contextual trigger for including the "PM Porfolio" document in the contextual library. The particular document (e.g., "PM Porfolio") will not be hosted or retrieved from the URL entered. However, after making the assignment shown in FIG. 4, when users who have the particular document in their personal collections (or in a group collection or library, if one is being used) navigate to one of the URLs assigned in the interface 400 of FIG. 4 (or to any URL in a domain, if set in this manner), the particular document will be shown as relevant to that context. In other words, if a user navigates to "example.com" in a browser, the "PM Portfolio" document will be selected as relevant to the current context and will be made available through the contextual library icon in the browser. This technique allows users to associate specific documents with specific contexts provided by other documents. In effect, this allows user to embed a document into another document, since documents assigned in this manner will be selectively indicated and made available in the browser user interface in a context-dependent manner.

In the example of FIG. 4, the user interface 400 provides a field to specify a URL as the contextual factor used to determine that a document (e.g., "PM Portfolio") should be shown as relevant to another document (e.g., "example.com"). The computer system can provide interfaces that enable other types of contextual factors to be specified, such as topics, keywords, users, departments, organizations, times, locations, and so on, and combinations thereof. Prompts and other interface components may enable users to enter values for one or more of these other contextual factors, and/or to select from lists of predetermined values for contextual factors. Once entered by a user, the computer system can store labels or tags indicating the contextual attributes for a document. When users use a browser or another application, the context is determined as discussed above (e.g., in FIG. 1), and the computer system compares the attributes of the current context with the stored contextual attribute labels. When a match is found, the document can be selected to be indicated as relevant in the contextual library.

In some implementations, a computer system learns the types of context for which documents are relevant based on tracked usage data. For example, the document access patterns of various users can be tracked to determine which documents are open at the same time or in the same session. Accordingly, groups or clusters of documents can be identified as related to each other. Then, when a user navigates to or otherwise accesses one of the documents in the group or cluster, the computer system determines that the other documents in the group or cluster are also relevant and should be indicated through the contextual library features. More generally, the computer system can learn or estimate which topics are associated with documents and store the topic estimates, e.g., in metadata for the documents. Then, when a user accesses a document associated with a particular topic, the computer system can select other documents that have been associated with that topic (e.g., labeled with the topic in metadata) as relevant to the current context. In some implementations, topics can be defined narrowly, such as based on combinations of multiple phrases or keywords being present in a document together, potentially along with other specified document characteristics.

As discussed above, the set of documents from which documents to indicate as contextually relevant may be a customized or personalized set of documents. For example, the documents may be taken from a set that is within a current user's library, e.g., documents added to the library by the user, documents previously accessed by the user, and/or documents shared with the user by other users. In some implementations, the set of source documents may be a limited set for an organization or a department within an organization.

In some implementations, the source set of documents may or may not be a document set that is not customized for users, roles, departments, or organizations (e.g., a large public document set, with the same set of source documents used for many or all users). Nevertheless, relevance criteria for determining whether to select or indicate a document as relevant may take into account specific factors of individual users, such as the user's prior search query history, browsing history, document access history. In addition, in order for a document to be indicated as relevant to a user, the document may be required to have a relevance score that meets a threshold, and the threshold may be high to limit the number of documents shown to those that are highly likely to be relevant to the current user.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
   providing, by one or more computing devices, an interactive element for display in a user interface of a web browser running on the one or more computing devices, wherein the interactive element is an icon or button provided by a third-party extension module for the web browser, the icon or button being integrated into the user interface of the web browser such that the icon or button is maintained persistent in the user interface across navigation to different web pages using the web browser;
   generating, by the one or more computing devices, context data that indicates a context of the one or more computing devices, the context data indicating a uniform resource locator (URL) for a resource displayed in the web browser;
   obtaining, by the one or more computing devices, document data indicating a subset of documents from a document collection associated with a user of the one or more computing devices, the subset of documents being selected from the document collection based on the URL indicated by the context data;
   in response to obtaining the document data, changing an appearance of the icon or button, without identifying in the user interface any documents in the subset selected based on the URL indicated by the context data, to adjust the appearance of the icon or button that is displayed concurrently with the resource displayed in the web browser, the appearance of the icon or button being changed based on the number of documents in the subset selected based on the URL indicated by the context data;
   after obtaining the data indicating the subset of documents and before displaying identifying information for the subset of documents selected based on the URL, receiving, by the one or more computing devices, data indicating user interaction with the interactive element; and
   in response to receiving the data indicating user interaction with the interactive element, providing, by the one or more computing devices, data identifying the subset of documents for display.

2. The method of claim 1, comprising detecting that the web browser changed from presenting a first document with a first URL to presenting a second document with a second URL;
   wherein generating the context data, obtaining the data indicating a subset of documents, and changing the appearance of the icon or button are performed in response to detecting that the web browser changed from presenting the first document with the first URL to presenting the second document with the second URL.

3. The method of claim 1, wherein providing the data identifying the subset of documents for display comprises displaying an information panel overlay on the user interface, the information panel overlay identifying the documents subset of documents and including one or more interactive elements configured to receive user input to initiate opening of one or more of the documents in the subset of documents.

4. The method of claim 1, comprising, after providing the interactive control for display, repeating a series of operations that includes:
   detecting a change in the context of the one or more computing devices;
   generating updated context data indicating the changed context of the one or more computing devices; and
   obtaining, based on the updated context data, updated document data indicating an updated subset of documents selected from the document collection.

5. The method of claim 1, comprising determining an identifier for the user;
  wherein obtaining the document data comprises obtaining document data indicating a subset selected from a personalized document collection for the user that is identified based on the identifier for the user, wherein the personalized document collection is a set of documents that the user has previously accessed.

6. The method of claim 1, wherein obtaining the document data indicating the subset of documents from the document collection associated with the user comprises:
  providing the context data to a server system over a communication network; and
  receiving the document data from the server system over the communication network in response to providing the context data.

7. The method of claim 6, comprising:
  in response to providing the context data, receiving document content for at least a particular document in the subset of documents;
  caching the document content at the one or more computing devices;
  after providing the data identifying the subset of documents for display, receiving data indicating interaction with an interface element for the particular document; and
  in response to receiving the data indicating interaction with the interface element for the particular document, using the cached document content to display a representation of the particular document.

8. The method of claim 1, wherein obtaining the document data indicating the subset of documents from the document collection associated with the user comprises selecting, by the one or more computing devices, a subset of the documents using an index of the documents in the document collection stored by the one or more computing devices.

9. The method of claim 1, wherein the user interface is a user interface of a web browser, and the web browser displays a resource corresponding to a uniform resource locator (URL);
  wherein obtaining the document data indicating the subset of documents from the document collection associated with the user comprises obtaining data indicating a set of documents that are not hosted in the same Internet domain as the URL but have a pre-determined association with at least a portion of the URL.

10. The method of claim 1, wherein obtaining the document data indicating the subset of documents from the document collection associated with the user comprises obtaining data indicating documents selected based on at least one of:
  output of one or more machine learning models generated in response to receiving the context data as input;
  previous document accesses by the user or other users;
  determining that one or more terms in the user interface are included in one or more documents in the document collection; or
  determining that the user interface is associated with a particular topic and that one or more documents in the document collection are associated with the particular topic.

11. The method of claim 1, wherein generating the context data comprises generating data indicating that document content of a document displayed in the user interface comprises one or more keywords from a predetermined set of keywords;
  wherein obtaining the document data indicating the subset of documents from the document collection associated with the user comprises obtaining, based on the context data, data indicating a subset of documents, from the document collection, that include or are associated with the one or more keywords included in the user interface.

12. The method of claim 1, wherein providing the interactive element for display comprises displaying an interactive element that is configured to cause the user interface to display, in response to a single interaction, a user interface panel identifying one or more documents determined to be relevant to the current context of the one or more computing devices;
  wherein the subset of documents from the document collection is selected based on the context data and is based on neither a search query nor filter criteria entered by the user to the user interface;
  wherein the user interaction with the interactive element comprises a single click, tap, hover, mouseover, or swipe on the interactive element; and
  wherein providing the data identifying the subset of documents for display comprises causing a user interface panel to appear that includes an interactive element configured to cause a particular document in the subset of documents to be displayed in response to user interaction with the interactive element in the user interface panel.

13. The method of claim 1, wherein the subset of documents is determined based on one or more pre-assigned mappings between documents and URLs or domain names, wherein at least one document in the subset is selected based on at least a portion of the URL or domain name of the resource displayed in the web browser being mapped, in the pre-assigned mappings, to the at least one document.

14. The method of claim 13, wherein the at least one document is included in the subset based on a pre-assigned mapping generated based on a user manually specifying, before the web browser navigated to the document having the URL, that the at least one document should be mapped to at least a portion of the URL or domain name of the resource of the resource displayed in the web browser.

15. The method of claim 1, wherein the subset of documents is determined based on pre-assigned mappings between keywords and documents, wherein at least one document in the subset is selected based on content of the resource displayed in the web browser including one or more keywords mapped, in the pre-assigned mappings, to the at least one document.

16. The method of claim 1, wherein changing the appearance of the icon or button comprises including, in an area of the icon or button, the number of documents in the subset selected based on the URL indicated by the context data.

17. The method of claim 1, wherein the appearance of the icon or button is changed to indicate that one or more documents have been selected for the current context of the web browser without describing the documents in the selected subset.

18. A system comprising:
  one or more computers; and
  one or more computer-readable media storing instructions that, when executed by the one or more computers, cause the one or more computers to perform operations comprising:
    providing an interactive element for display in a user interface of a web browser running on the one or more computing devices;

generating context data that indicates a context of the one or more computing devices, the context data indicating a uniform resource locator (URL) for a resource displayed in the web browser;

obtaining document data indicating a subset of documents from a document collection associated with a user of the one or more computing devices, the subset of documents being selected from the document collection based on the URL indicated by the context data, wherein a first document is included in the subset based on (i) a stored mapping of the first document to a particular Internet domain, wherein the stored document designates the first document to be recommended when any of multiple resources in the particular Internet domain are displayed, and (ii) a determination that the resource displayed in the web browser is a web page in the particular Internet domain;

after obtaining the data indicating the subset of documents and before displaying identifying information for the subset of documents selected based on the URL, receiving data indicating user interaction with the interactive element; and in response to receiving the data indicating user interaction with the interactive element data identifying the subset of documents for display.

19. The system of claim 18, wherein the stored mapping is generated in response to an instruction from an administrator, before the web browser navigated to the resource having the URL, to set the first document as a recommended document for resources in the particular Internet domain.

20. One or more non-transitory computer-readable media storing instructions that, when executed by one or more computers, cause the one or more computers to perform operations comprising:

providing an interactive element for display in a user interface of a web browser running on the one or more computing devices;

generating context data that indicates a context of the one or more computing devices, the context data indicating a particular keyword occurring in a resource displayed in the web browser;

obtaining document data indicating a subset of documents from a document collection associated with a user of the one or more computing devices, the subset of documents being selected from the document collection based on stored mappings between specific keywords and specific documents designated to correspond to the specific keywords, wherein the subset includes at least a first document selected based on (i) the context data indicating that the particular keyword occurs in the resource displayed in the web browser, and (ii) the stored mappings mapping the particular keyword to the first document;

after obtaining the data indicating the subset of documents and before displaying identifying information for the subset of documents, receiving data indicating user interaction with the interactive element; and in response to receiving the data indicating user interaction with the interactive element, providing data identifying the subset of documents for display.

* * * * *

UNITED STATES PATENT AND TRADEMARK OFFICE
CERTIFICATE OF CORRECTION

PATENT NO. : 11,151,217 B2
APPLICATION NO. : 16/691989
DATED : October 19, 2021
INVENTOR(S) : Ziraknejad et al.

Page 1 of 1

It is certified that error appears in the above-identified patent and that said Letters Patent is hereby corrected as shown below:

In the Claims

In Claim 14, Column 18, Lines 41-42, delete "of the resource of the resource" and insert --of the resource--, therefor.

In Claim 18, Column 18, Line 60, delete "computers" and insert --computing devices--.

In Claim 18, Column 18, Line 62, delete "computers" and insert --computing devices--.

In Claim 18, Column 18, Line 63, delete "computers" and insert --computing devices--.

In Claim 18, Column 19, Line 13, delete "document" (first occurrence only) and insert --mapping--.

In Claim 18, Column 19, Line 25, delete "element" and insert --element, providing--.

In Claim 20, Column 20, Line 3, delete "computers" (both occurrences) and insert --computing devices--.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*